United States Patent [19]
Sekulich et al.

[11] 3,771,799
[45] Nov. 13, 1973

[54] MULTI-ELEMENT FLUCTUATING PRESSURE SEAL

[75] Inventors: Stephen A. Sekulich, Brighton; Frederick R. Hatch, Ann Arbor, both of Mich.

[73] Assignee: The Mather Company, Toledo, Ohio

[22] Filed: Aug. 20, 1971

[21] Appl. No.: 173,553

[52] U.S. Cl. .................. 277/65, 277/47, 277/58, 277/84
[51] Int. Cl. ................... F16j 15/32, F16j 15/38
[58] Field of Search ............. 277/65, 47, 58, 51, 277/82, 153

[56] References Cited
UNITED STATES PATENTS

| | | | |
|---|---|---|---|
| 2,073,768 | 3/1937 | Victor et al. | 277/16 X |
| 2,172,325 | 9/1939 | Victor et al. | 277/47 |
| 2,185,790 | 1/1940 | Kosotka et al. | 277/47 |
| 2,202,944 | 6/1940 | Boyd | 277/58 X |
| 3,511,512 | 5/1970 | Wheelock | 277/58 X |
| 3,099,454 | 7/1963 | Walinski | 277/47 |
| 3,345,115 | 10/1967 | Olender et al. | 277/65 X |
| 3,572,732 | 3/1971 | Sekulich | 277/153 |

OTHER PUBLICATIONS
National Oil Seal Log Book, Product Engineering, Dec. 1948, page 51.

*Primary Examiner*—Samuel B. Rothberg
*Attorney*—Hugh Adam Kirk

[57] ABSTRACT

An annular housing having an outer flanged frusto-conical or substantially obtuse angled cross-section polytetrafluoroethylene lip seal urged into contact with a rotating shaft by a garter spring, and at least one inner polytetrafluoroethylene seal separated from the outer seal in the housing by an annular partition which forms a chamber in the housing between the partition and the outer seal. The inner seal may have either an obtuse angled cross-section and urged into contact with the shaft by its own residual forces, or it may have a substantially rectangular cross-section and be rotated with the shaft and form a face seal with the partition. The housing may also have outside the outer seal a dust lip seal and also one or more gaskets to prevent internal leakage.

18 Claims, 9 Drawing Figures

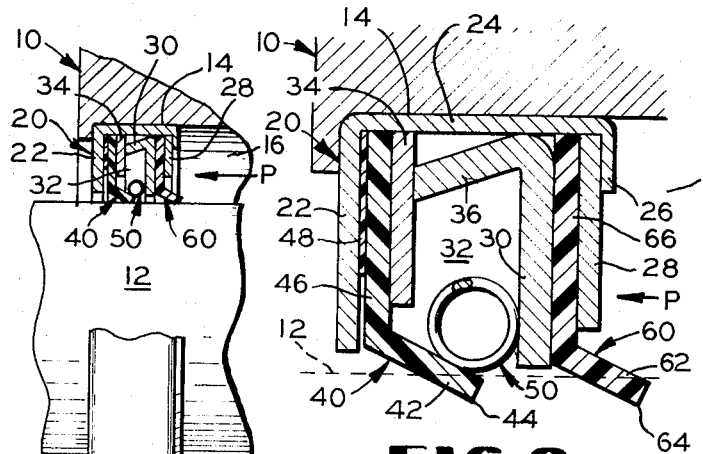

MULTI-ELEMENT FLUCTUATING PRESSURE SEAL

BACKGROUND OF THE INVENTION

If a high fluid pressure, i.e., above about 100 pounds per square inch, is applied to a frusto-conical or a J-shaped cross-section lip seal urged into contact with a rotating shaft by a garter spring and this fluid pressure, this pressure increases the loading on the seal so that both shaft and seal wear occur. Then in order to overcome this wear at such a high fluid pressure, a seal with a relatively strong garter spring was inserted in the seal support housing so that the high fluid pressure tended to expand the garter spring and counterbalance its load. However, when the fluid pressure decreased, this strong spring also produced excessive wear. This wear increases the running temperature of the seal which in turn breaks down its organic composition and that of the fluid to form abrasive carbon particles, which further increases the wear and cause seal leakage.

Since most applications for fluid pressure seals involve fluctuations between high and low fluid pressures, a large plurality of seals with relatively weak garter springs were employed which took up a large amount of space and axial length of the shaft, to provide smaller increments of fluid pressure between adjacent seals. An example of such a plurality of seals is shown in Schmitt U. S. Pat. No. 3,516,679 in which the fluid pressure is applied from the opposite sides of the seals from those of the garter spring.

SUMMARY OF THE INVENTION

Generally speaking, the multi-element variable fluid pressure seal of this invention is for providing a fluid under high or low, constant or fluctuating pressures from leaking out around a rotating shaft, and comprises a relatively small number of sealing elements of at least two successive polytetrafluoroethylene ring seals, the inner one of which adjacent the higher pressure is employed primarily for reducing the pressure before it reaches the outer or other ring seal mounted in a lower pressure chamber provided in the annular housing which supports both seals. The polytetrafluoroethylene sealing elements may contain a filler, such as glass fibers and/or graphite or the like.

This annular seal housing is a radially inwardly opening U-shaped channel which may be composed of two sections, one of which has at least an L-shaped cross-section with one leg of the L being radial of the rotating shaft and the other leg being parallel to the axis of the shaft and snugly fitting into to be fixed to the seal bore or seal support housing such as for the bearing for the shaft. The other section of this annular seal housing may comprise a radial ring that axially telescopes inside the L-shaped housing and may be rigidly clamped therein by spinning or crimping over the outer end of the axially extending leg thereof. This other section may have an axially offset radially inwardly extending portion to fit closer to the periphery of the inner seal when it is of lesser outside diameter.

The outer obtuse angled cross-section polytetrafluoroethylene seal has an inner flexible frusto-conical or lip portion and an outer radial flange portion. Around the outside of this frusto-conical portion, there is preferably provided a garter spring for insuring its continuous contact of its lip with the outside surface of the shaft. The radial flange portion of this outer seal is clamped by a partition means, which also telescopes inside of this L-shaped section of the seal housing, against the radial leg of the L-shaped section, and may be clamped therein together with a gasket to prevent internal leakage of the seal assembly, and may also be clamped together with a further outer dust type seal to prevent dirt and dust from entering onto the surface of the shaft against which the two lip seals of this invention operate. This clamping partition which is fixed to the housing also provides an inner chamber in the seal housing for the garter spring which has a reduced pressure that is a step-down in pressure from that inside the seal bore or seal support housing. This step-down in pressure is provided by the inner or other sealing means mounted in the seal housing.

Between this partition means and the other or radial section of the seal housing, there is provided a second chamber in said U-shaped housing in which is located this other polytetrafluoroethylene sealing element, elements or means which may take either of two forms, one of which may be an obtuse angled cross-sectional seal similar to that of the outer seal and the other a face type seal which rotates with the shaft and seals against the partition means in the seal housing. Both forms should permit lubricant to seep by it to provide a lubricating film for the outer lip seal, and this inner sealing means is primarily employed for reducing the higher pressure in the seal support chamber so that the other and outer lip seal may operate in a normal manner.

The inner obtuse angled cross-sectional form of seal element does not have a garter spring because the pressure in the seal support chamber not only permits a slight amount of lubricant to seep by it but also maintains it in adequate contact with the shaft to effect a drop in pressure between the seal support chamber and the chamber in the seal housing. This form of seal element is preferably clamped by the other telescopic section of the seal housing against the partition means and may also be clamped with a gasket to further prevent internal leakage.

The other form or face type inner seal element or elements which may be provided in the seal housing comprises a polytetrafluoroethylene ring of substantially square or rectangular cross-section which clamps onto the shaft and rotates with it, with at least one of its radial sides in contact as a face seal with an adjacent side of the housing and/or a radial partition means therein. This face type or form of inner seal has the advantage of avoiding all wear on the shaft, and any heat due to friction occurs against the seal housing and/or partition means which are preferably heat conducting members which conduct the heat away from the shaft into the housings. This form of seal element may have a garter spring therearound to insure its clamping engagement and rotation with the shaft, and therefore may be provided with a notch in its outer periphery for the seating of such garter spring.

Accordingly it is an object of this invention to produce a multi-element seal which effectively seals at both high and low pressures and fluctuations in pressure therebetween, i.e., from zero to several hundred pounds per square inch pressure.

Another object is to produce such a multi-element variable pressure seal which diminishes the build-up of heat and wear both on its sealing elements and the moving member sealed.

BRIEF DESCRIPTION OF THE VIEWS

The above mentioned and other features, objects and advantages and the manner of attaining them are described more specifically below by reference to embodiments of this invention shown in the accompanying drawings, wherein:

FIG. 1 is a partial sectional view of one embodiment of the multi-element seal assembly of this invention shown mounted in a seat in the housing surrounding a rotating shaft, which housing has a higher pressure inside than out;

FIG. 2 is an enlarged radial sectional view of the annular seal assembly shown in FIG. 1 wherein both seals are of the obtuse angled radial cross-section type;

FIG. 3 is a radial section of a modified form of the embodiment of the seal shown in FIG. 2, wherein the inner seal has lesser outside diameter than the outer seal;

FIG. 4 is a radial section of a multi-element seal assembly similar to that shown in FIG. 3 with the addition of an outer dust type seal outside the outer seal;

FIG. 5 is a radial section of a multi-element seal assembly similar to that shown in FIG. 2, but also having a dust type seal and a partition between it and the outer seal member;

FIG. 6 is a radial section of another embodiment of a multi-element seal assembly according to this invention, wherein the inner seal is attached to the shaft and acts as a face type seal against the partition member in the seal assembly;

FIG. 7 is a radial section similar to that shown in FIG. 6 in which the inner telescopic section of the housing has a stepped cross-section;

FIG. 8 is a radial section similar to that shown in FIG. 3 but adapted for the type of embodiment for the inner seal shown in FIG. 6; and FIG. 9 is a radial section of still another modification of the type of inner seal similar to FIG. 7 but showing a plurality thereof and including therewith an outer dust seal.

DETAILED DESCRIPTION OF THE PREFERRED EMBODIMENTS

Referring first to the preferred embodiments shown in FIGS. 1 through 5 wherein the two seals are of the frusto-conical radial flange or obtuse angled cross-section type, there is shown in FIG. 1 a portion of the seal support housing 10, which support housing 10 has an annular seat 14 into which the outside periphery of the seal assembly housing 20 of the multi-element seal assembly of this invention snugly fits or is press fitted and may even contain a sealer between its periphery and the seat 14 to prevent leakage of the pressure P inside the support housing 10 from the space 16. In FIG. 1 the shaft 12 is shown deforming the lip type seals of this invention while in the other figures the location of the surface of the shaft 12 is shown in dotted lines, with the seals in the inoperable states before being inserted on the shaft 12. Furthermore, similar parts of all the different embodiments and modifications shown are given either the same or similar reference characters.

Referring now specifically to FIG. 2, the outer seal housing 20 comprises two annular metal sections, one section 22 of which has an L-shaped cross-section with one leg radially of the shaft 12 and the other leg 24 being circumferential and parallel to the axis of the shaft 12 and which may have a down turned outwardly flanged portion 26 for clampingly engaging the other section 28 of the housing 20. This other section 28 may comprise a ring parallel to the radial flange portion of the section 22 to clamp the two seal members in the housing 20 with a partition means 30 therebetween.

In this particular embodiment an outer polytetrafluoroethylene seal member 40 has a frusto-conical portion 42 with an inner lip 44 which preferably is urged into contact with the outside circumferential surface of the shaft 12 by means of a garter spring 50 located in an annular chamber 32 formed by the partition means 30 in the seal housing 20. A radial flange portion 46 of this outer lip type seal is herein shown to be clamped with a gasket 48 against the radial leg of the L-shaped housing section 22 by means of an annular metal ring 34 which may be part of the partition means 30, and a projection 36 of the L-shaped cross-sectional portion of the partition 30 forming the lower pressure chamber 32.

Another obtuse angled type polytetrafluoroethylene sealing means 60 in FIG. 2 has a frusto-conical portion 62 whose lip 64 contacts the outer surface of the shaft 12 urged against this shaft by its own inherent residual forces and the pressure P inside of the chamber 16 depending upon the amounts of pressure P. The length and/or thickness of this frusto-conical portion 62 may be varied. The radial flange portion 66 of this sealing means 60 is clamped between the radial portion for the partition 30 and the inner telescoping housing section 28 by means of the spun-over flange 26 of the outer end of the housing section 22.

Referring now to FIG. 3 the L-shaped cross-sectional housing portion 22' has a shorter axially extending portion 24' and the partition means 30' has an axial offset stepped or substantially Z-shaped radial cross-section as does the telescoping inner housing section 28'. This configuration reduces materially the outer diameter and quantity of expensive polytetrafluoroethylene required in the higher pressure seal member 60'. The other portions of this modified double seal assembly, namely the gasket 48 and the outer lip seal 40 are the same as that shown in FIG. 2 and have been given the same reference characters since they also have the same purpose and function.

Now referring to the modification shown in FIG. 4, it is similar to that shown in FIG. 3 except that between the lower pressure lip type seal 40 and the gasket 48 there is provided a dust seal 70, which also may be of an obtuse angled radial cross-section, with a frusto-conical portion 72 and radial flange section 76. Its lip portion 74 prevents dust and other dirt from coming in from the outside to contaminate the surface of the shaft 12 and interfere with sealing of the lip type seals 40 and 60'. This dust seal 70 also may be made of polytetrafluoroethylene, but such is not necessary, in that a cheaper flexible and/or elastomeric material such as rubber or other plastic may serve this purpose well.

Referring to FIG. 5, there is shown another modification of the multi-element seal embodiment of this invention, similar to that shown in FIGS. 2 and 4, but with the addition of an annular metal spacer ring 78 disposed between a dust seal 70 and the pressure seal 40 for more positively supporting such seals.

Referring now to the other general embodiment of the multi-element seal assembly shown in FIGS. 6 through 9, the radial cross-sections of these seals show the higher pressure sealing means 80, 80', 80" and 80'" to comprise a substantially rectangular radial cross-sectional ring, which clamps onto the shaft 12 and rotates therewith and relative to the partition member 30, 30', or 30" and the seal housing sections 28', 28" or 28'".

In the specific embodiment shown in FIG. 6, the higher pressure inner sealing means 80 comprises a ring of polytetrafluoroethylene which may be held attached to the shaft 12 by means of a garter spring 52 that seats in a U-shaped groove 82 in the outer peripheral surface of the ring 80. Since this sealing ring 80 rotates relative to the housing 20, its radial faces, such as face 84 rotates relative to the radial face of the partition 30 to form a face seal therewith. This sealing reduces the pressure P in the inner annular chamber 32 which chamber in turn is then sealed by lower pressure lip type seal 40. In this embodiment the inner telescoping housing section 28" is shown to have a thick L-shaped cross-section in order to fill most of the annular space outside the seal 80 to prevent it from movement away from the shaft 12. There also may be provided a gasket 48' between this housing section 28" and the partition means 30 to prevent other leakage into the chamber 32.

The use of the garter spring 52 however, is optional as shown in the modification in FIG. 7 wherein the higher pressure rotating sealing means 80' is ungrooved. In this modification instead of making a thick telescoping housing section 28" as shown in FIG. 6, there is provided a thinner L-shaped housing section 28' similar to that shown in FIG. 3, so that its offset portion acts to restrain outward movement of seal 80'.

Referring next to the modification shown in FIG. 8 the higher pressure inner seal 80" has a V-shaped notch 82' therein so the garter spring 52 tends to urge its radial surface 84' against the inner surface of an L-shaped radial cross-section partition member 30' (as shown in FIG. 3) to effect a better face seal.

FIG. 9 shows still another modification of the multi-element seal having the features of FIG. 7 described above, and in addition thereto having a dust seal 70 similar to that shown in FIGS. 4 and 5, and also a second inner seal element 80'" spaced from the other inner seal 80' by means of a second radial portion 30" and/or sealed at its outer periphery into the off-set axial portion of the other housing section 28'". These inner sealing elements 80' and 80'" may be snugly clamped between the radial portions of the partition 30 and other housing section 28'" and with the second partition 30" but still permit relative movement of these inner seals 80' and 80'" therewith.

Although there are several different embodiments and means shown for holding the two or more different types of seals of this invention in the housing 20, this housing including its sections and partition means may have still other and different configurations for holding the multi-element sealing means. Also, it is to be clearly understood that any one of the features shown in one embodiment or modification thereof may be interchanged with another embodiment or modification for performing the desired function without departing from the scope of this invention. For example, dust seals may be provided with any one of the embodiments or modifications or may be removed from those in which it is shown, and two or more inner sealing elements may be provided in any of the embodiments. Furthermore, the polytetrafluoroethylene of the sealing elements may contain a filler such as glass fibers and/or graphite.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

We claim:

1. A multi-element high or low, constant or fluctuating fluid pressure seal between two relatively moving parts, said seal comprising:
   a. an annular radially inwardly opening U-shaped channel housing fixed to one of said moving parts,
   b. an annular partition means fixed in and to said channel of said housing, said partition means having a radial portion that forms two annular chambers in said housing,
   c. a first polytetrafluroethylene ring seal element fixedly mounted to said housing in one of said annular chambers, said element having an obtuse angled cross-section comprising a radial portion and a frustoconical portion so that its concave side faces the other chamber in said housing, and
   d. a second polytetrafluoroethylene ring face type element located in said other chamber in said housing and moveable relative to said housing and said partition means and in face contact with said radial portion of said partition means.

2. A seal according to claim 1 including an additional dust type ring seal between said first seal element and said housing.

3. A seal according to claim 2 including an annular spacer between said dust seal and said first seal element.

4. A seal according to claim 1 including a gasket between said first seal element and said housing.

5. A seal according to claim 1 wherein one side of the channel of said housing comprises an axially stepped portion and wherein said partition means comprises a similarly stepped portion telescoping with said stepped portion of said one side of said channel.

6. A seal according to claim 1 for a rotating shaft wherein said second seal element is attached to rotate with said shaft.

7. A seal according to claim 6 wherein said second seal element includes a garter spring for urging it radially inwardly.

8. A seal according to claim 7 wherein said second seal element comprises a groove in its outer circumferential surface for seating said garter spring.

9. A seal according to claim 8 wherein said groove is V-shaped whereby said garter spring tends to urge the outer radial surface of said second seal element against at least said partition means to provide a face seal therewith.

10. A seal according to claim 1 having more than one said second ring face type seal element moveable relative to said housing and said partition means and in face contact therewith.

11. A multi-element high or low, constant or fluctuating fluid pressure seal for a rotating shaft comprising:
   a. an annular housing,
   b. an outer polytetrafluoroethylene ring seal element mounted in said housing, said element having an obtuse angled cross-section comprising a radial ring portion and a frusto-conical portion, c. a garter spring located inside the obtuse angle of said outer seal element and against said frusto-conical portion, d. an annular partition means in said housing forming an annular chamber for said garter spring, and e. an inner polytetrafluoroethylene ring seal element attached to and rotating with said shaft and located between said partition means and said housing.

12. A seal according to claim 11 including an additional dust type seal between said outer seal element and said housing.

13. A seal according to claim 11 wherein said housing comprises an inner and an outer telescoping annular ring section and said inner section has a radially inwardly stepped portion and wherein said partition means comprises a similarly inwardly stepped portion telescoping with said stepped portion of said inner section for locating said inner seal element.

14. A seal according to claim 11 wherein said inner seal element includes a garter spring for urging it radially inwardly.

15. A seal according to claim 14 wherein said inner seal element comprises a groove in its outer circumferential surface for seating said garter spring.

16. A seal according to claim 15 wherein said groove is V-shaped whereby said garter spring tends to urge the outer radial surface of said inner seal element against at least said partition member to provide a face seal therewith.

17. A seal according to claim 15 having more than one said inner ring seal element.

18. A seal according to claim 1 including a garter spring located inside the obtuse angle of said outer seal element and against said frusto-conical portion.

* * * * *